United States Patent [19]

Hachimura

[11] 4,262,432
[45] Apr. 21, 1981

[54] STUDY DEVICE
[75] Inventor: Fukuji Hachimura, Tokyo, Japan
[73] Assignee: Gakken Co., Ltd., Tokyo, Japan
[21] Appl. No.: 102,274
[22] Filed: Dec. 10, 1979
[30] Foreign Application Priority Data Jan. 25, 1979 [JP] Japan ............................. 54/8649[U]

[51] Int. Cl.³ .............................................. G09B 1/06
[52] U.S. Cl. ..................................... 434/161; 434/348
[58] Field of Search ........................ 35/9 R, 5, 6, 35 D
[56] References Cited

U.S. PATENT DOCUMENTS

| 958,781 | 5/1910 | Spencer | 35/35 D X |
| 1,385,256 | 7/1921 | McCann | 35/5 |
| 1,469,750 | 10/1923 | Yelf | 35/5 |
| 3,587,178 | 6/1971 | Kojima | 35/6 |

*Primary Examiner*—William H. Grieb
*Attorney, Agent, or Firm*—Irving M. Weiner; Pamela S. Burt; John L. Shortley

[57] ABSTRACT

A study device for teaching children or other users predetermined study items, such as letters of the alphabet, in response to depressing desired ones of a plurality of push-plate operating portions. The study device includes a casing having a plurality of study elements provided in horizontal rows and vertical columns. Each study element includes an indication plate having an indication surface formed on the upper surface thereof, and a push-plate disposed below the indication plate, the push-plate including a resiliently supported operating portion. When the operating portion of a particular push-plate is depressed by the child, the indication plate will rotate to stand upright. One resilient member resiliently supports a plurality of the operating portions of the push-plates.

12 Claims, 9 Drawing Figures

U.S. Patent   Apr. 21, 1981   Sheet 3 of 3   4,262,432
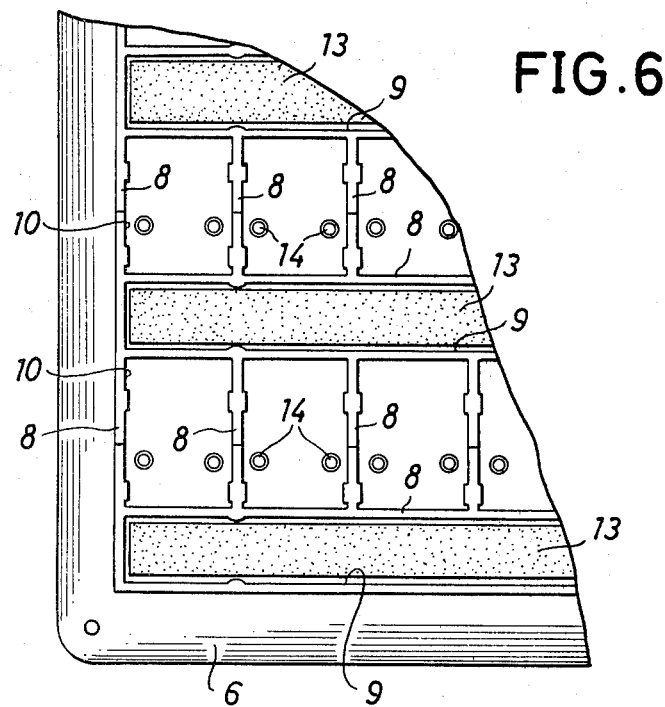
FIG.6
FIG.7   FIG.8   FIG.9
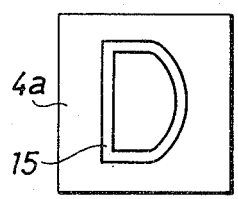
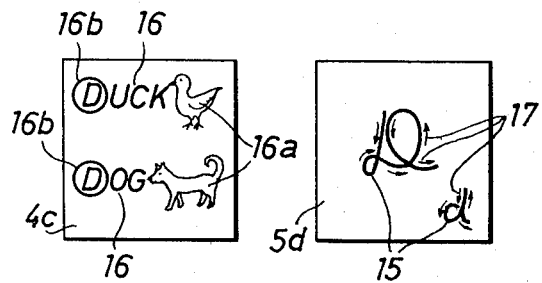
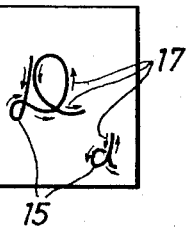

STUDY DEVICE

BACKGROUND OF THE INVENTION

1. Field of the Invention

The present invention relates generally to a study device which permits children or other users to learn letters of the alphabet or other study items by depressing a push-plate so as to move an indication plate to an upright position.

2. Description of the Relevant Art

Because educational devices for children are produced in quantity and sold on a large scale, it is highly desirable that the device be simplified in structure and that the process of assemblying same also be simplified, so as to reduce costs. With particular regard to study devices which include push-buttons, the structure of the push-button mechanism is often quite complicated because the number of springs required is equal to the number of push-buttons provided. Such structure complicates the assembly process and increases costs. Therefore, there has developed a need for providing a simplified structure of an elastic suppot member which resiliently supports the push-buttons of the device.

The present invention provides a study device having a simplified structure which overcomes the foregoing problems attendant conventional education devices, particularly of the push-button type.

SUMMARY OF THE INVENTION

The present invention provides a study device which includes a casing, and a plurality of push-plates rotatably supported by first shafts on the casing, each push-plate including an operating portion. Indication plates are rotatably supported by second shafts on the casing, the second shafts being arranged substantially behind and parallel to the first shafts. Each of the indication plates includes at least one indication surface, and is disposed so as to lie substantially flat on the push-plate. Also provided is at least one resilient member, each of which resiliently supports a plurality of operating portions of the push-plates.

An object of the present invention is to provide a study device wherein a plurality of supports means for resiliently supporting the push-plates are replaced by one resilient member so as to simplify the structure and assembly work, and thereby reduce the cost of production.

Another object of the present invention is to provide a study device which includes a multiplicity of indication surfaces on which to present study items to be learned.

Other objects and advantages of the present invention will become apparent from the following detailed description of a preferred embodiment of the invention, when read in conjunction with the accompanying drawings.

BRIEF DESCRIPTION OF THE DRAWINGS

FIG. 6 depicts a partial plan view of an internal casing.

FIGS. 7 through 9 illustrate exemplary study items.

DETAILED DESCRIPTION OF PREFERRED EMBODIMENTS

Figure 1:
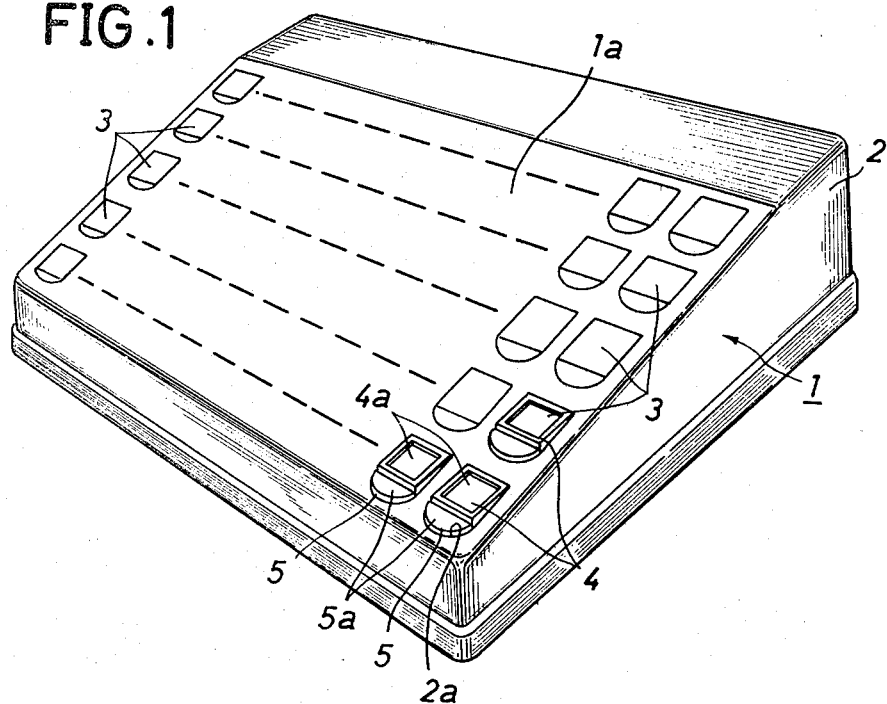
FIG. 1 illustrates a perspective view of the study device according to the present invention.
Figure 2:
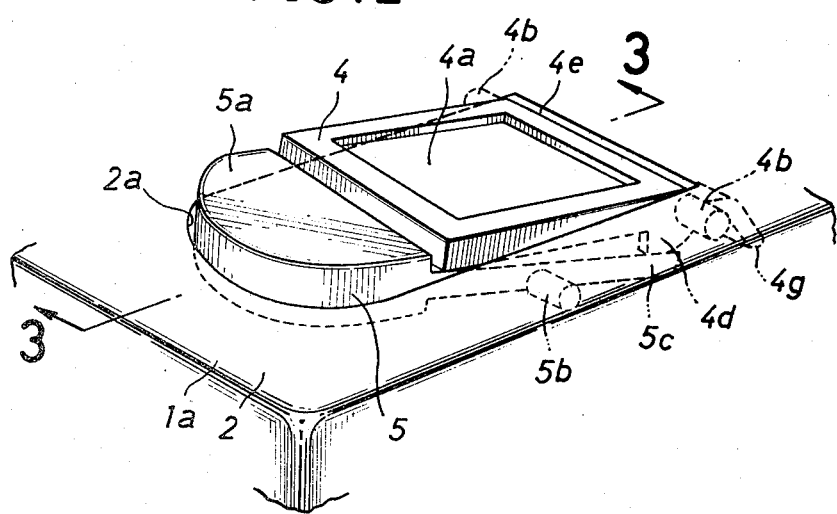
FIG. 2 is an enlarged perspective view depicting a part of the study device.
Figure 3:
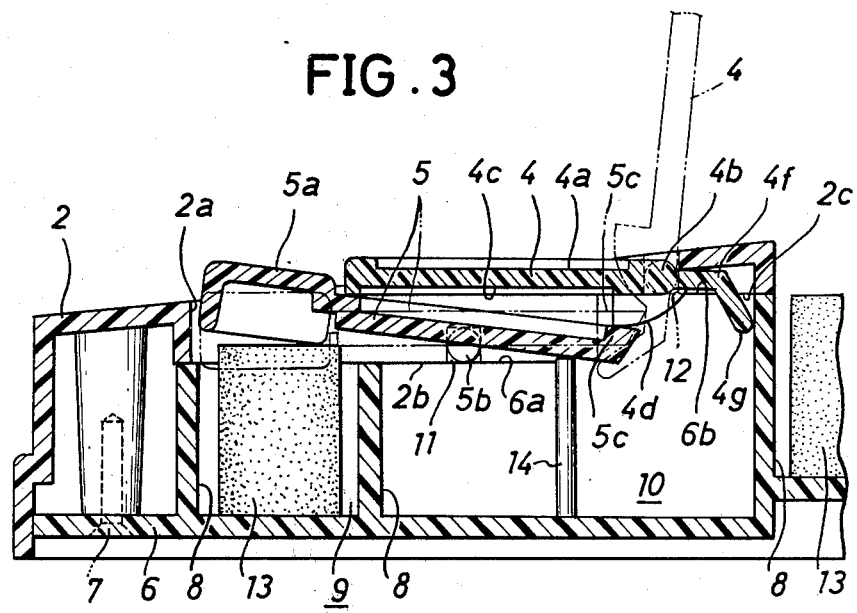
FIG. 3 is a cross-sectional view taken along line 3—3 of FIG. 2.

With reference to FIGS. 1, 2 and 3, the study device 1 in accordance with the invention comprises an external casing 2 and an internal casing 6. A number of study elements 3 are arranged in regular horizontal rows and vertical columns on the upper surface 1a of the external casing 2 of study device 1. It will be understood that any desired number of study elements 3 may be provided.

Each study element 3 includes an indication plate 4 having an indication surface 4a formed on the upper surface thereof, and a push-plate 5 disposed below the indication plate 4. As shown in FIGS. 2 and 3, the front end portion of push-plate 5 projects forwardly beyond the indication plate 4 and is exposed to an operator's view. The indication plate 4 and the push-plate 5 are exposed from an opening 2a formed in external casing 2 such that the surface 4a of indication plate 4 and the front end portion of push-plate 5 can be seen from the outside. The exposed front end portion of the push-plate 5 comprises an operating portion 5a.

The push-plate 5 is rotatably supported on external casing 2 by a pair of oppositely-extending shafts 5b which are formed respectively on each side of a mid portion in the longitudinal direction of push-plate 5. The indication plate 4 is rotatably supported at opposite sides of the rear end 4e of plate 4 by a pair of shafts 4b on external casing 2 such that the indication plate 4 can be made to stand substantially upright or lie flat. The shafts 4b of indication plate 4 are disposed rearwardly of the rear end 5c of push-plate 5 and extend substantially parallel to shafts 5b of push-plate 5. The operating portion 5a of push-plate 5 is supported at the underside thereof by a slender block-shaped resilient member formed of urethane material and disposed laterally in the internal casing 6. The external casing 2 is mounted on the internal casing 6 such that the indication plate 4 and the push-plate 5 project toward the front from the opening 2a formed on the front surface of the external casing 2.

The internal casing 6 and the external casing 2 are secured together by suitable fastening means, such as screws 7. The undersurface of the external casing 2 is formed so as to include a lower step 2b provided with a recess 11 and an upper step 2c provided with a recess 12. When the internal casing 6 and the external casing 2 are joined together, as shown in FIG. 3, the recesses 11, 12 cooperate with the upper surfaces 6a, 6b of internal casing 6 to form bearing holes for supporting the shafts 5b of push-plate 5 and the shafts 4b of indication plate 4, respectively. The internal casing 6 includes compartments 9, 10 divided by a partition wall 8. The compartments 9 have disposed therein a resilient member 13 formed of urethane block or the like which applies a resilient upward pushing force to the underside of the front end of push-plate 5. The rear portion of push-plate 5, behind the shafts 5b, is supported by a stay 14 provided in the internal casing 6 to prevent clockwise rotation of push-plate 5 by resilient member 13. One resilient member 13 is employed for each horizontal row of study elements 3.

FIG. 6 is a partial plan view showing a detailed construction of the study device 1, with plates 4 and 5 removed. The laterally disposed elongated resilient member 13 is bonded to the bottom of each compartment 9 with a suitable bonding agent or the like. In the example shown in FIG. 1, five horizontal rows of study elements 3 are provided, and therefore five elongated resilient members 13 are fitted within internal casing 6. The number of resilient members 13 corresponds to the number of horizontal rows of elements 3. Each horizontal row of study elements 3, defined by the indication plates 4 and the puch-plates 5, has all of the push-plates 5 thereof supported by one common elongated resilient member 13.

Figure 4:
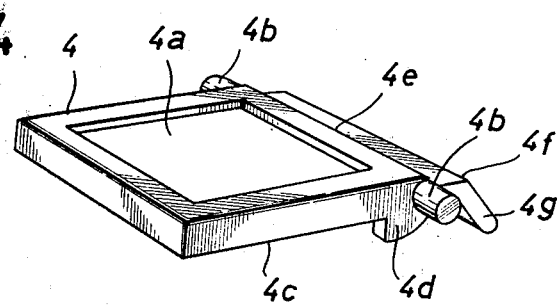
FIG. 4 depicts a perspctive view of an indication plate.

FIG. 4 is a perspective view of the indication plate 4 with the indication surface 4a provided on the upper surface thereof to display study items to be learned. Another indication surface 4c is provided on the undersurface of indication plate 4. The shafts 4b are formed at both sides of the rear end of indication plate 4, and are adapted to be inserted into the bearing holes 12 to support the plate 4. The indication plate 4 also has projections 4d formed at each side of the rear end thereof, the projections 4d being adapted to engage with the rear end 5c of push-plate 5. The undersurfaces of the projections 4d form an arcuate cam surface. Projected rearwardly from the rear end 4e of indication plate 4 is an extension 4f which determines the angle of elevation of the indication plate 4. The free end of the extension 4f is inclined downwardly to form a bend 4g.

Figure 5:
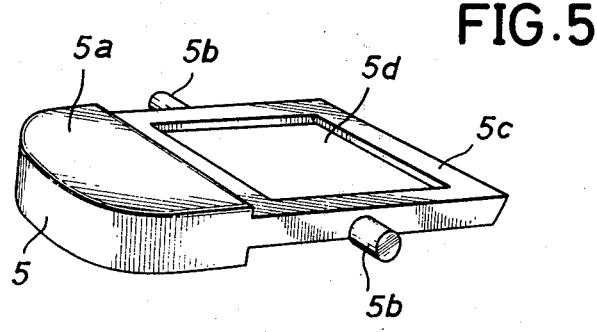
FIG. 5 illustrates a perspective view of a push-plate.

FIG. 5 is a perspective view of the push-plate 5, the upper surface thereof forming an indication surface 5d. The front portion of push-plate 5 is slightly thicker than the remaining portion thereof. The upper surface of the front portion which appears on the upper surface of the device forms the operating portion 5a, and the undersurface of the front portion bears on the resilient member 13. Formed on both sides of the central portion of the push-plate 5 are the shafts 5b, which are adapted to be rotatably supported in the bearing holes 11.

The study device of the present invention provides three surfaces which can be employed as indication surfaces for indicating various study items, i.e., the upper and lower surfaces of the indication plate 4, and the upper surface of the push-plate 5.

In the condition shown in FIG. 3, the rear end 5c of push-plate 5 bears against the cam surfaces defined by projections 4d formed at both sides of the rear end of indication plate 4. Because the projections 4d are disposed slightly forwardly of shafts 4b, the upward movement of the rear end 5c of push-plate 5 causes the indication plate 4 to rotate and stand substantially upright. When the indication plate 4 is rotated through a predetermined angle, the extension 4f of indication plate 4 abuts against the rear end 5c of push-plate 5, as shown by the dashed line in FIG. 3. In this manner, the extension 4f serves as a stopper to keep the indication plate 4 standing at a predetermined angle of elevation. Because the bend 4g extends below the underside of the rear end 5c of push-plate 5 with the extension 4f bearing against the rear end 5c, the rear end 5c pushes the bend 4g, as a result of the rotary recovering motion of push-plate 5, to rotate the indication plate 4 counterclockwise so that it returns to the original position thereof indicated by the full line in FIG. 3.

The method of utilizing the study device in accordance with the present invention will now be explained hereinbelow.

FIGS. 7 through 9 show one example of study items to be learned by children. The study item 15 shown in FIG. 7 is indicated on the upper indication surface 4a of the indication plate 4. The study item 16 shown in FIG. 8 is indicated on the lower indication surface 4c of the indication plate 4. The study item 17 shown in FIG. 9 is indicated on the indication surface 5d of the push-plate 5. The study device in this embodiment is employed in learning letters of the alphabet. When a child depresses the operating portion 5a of the push-plate 5 of an element related to the letter "D" (15), the underside of the operating portion 5a compresses the resilient member 13 to permit rotation of push-plate 5 so that the rear end 5c of push-plate 5 pushes up the cam surface 4e of projection 4d of indication plate 4, and the indication plate 4 is rotated about the shafts 4b and stands substantially upright so as to expose the undersurface thereof. The child can then see the names of animals 16b starting with the letter "D" (15) and the illustrations 16a of these animals. Furthermore, the child can follow the arrows 17a shown on the upper surface of the push-plate 5 indicating how to write the letter. In this manner, children can acquire knowledge about various letters of the alphabet by depressing the operation portion 5a of each study element 3 of study device 1 and learning study items presented on the indicator surfaces.

Although the above-described embodiment is provided with three surfaces on which letters and illustrations are indicated, i.e., the front and back surfaces of indication plate 4 and the upper surface of push-plate 5, it is possible to provide four indication surfaces by employing the upper surface of operating portion 5a of push-plate 5 as an additional indication surface. Further, it will be understood that the contents indicated on the indication surfaces are not limited to letters of the alphabet. For example, multiplication table study items may be marked on the indication surfaces.

Although there have been described what are at present considered to be the preferred embodiments of the invention, it will be understood that various modifications may be made therein without departing from the spirit or essential characteristics thereof. The present embodiments are therefore to be considered in all respects as illustrative, and not restrictive. The scope of the invention is indicated by the appended claims rather than by the foregoing description.

I claim:

1. A study device, comprising:
   a casing;
   a plurality of push-plates rotatably supported by first shafts on said casing;
   each said push-plate including an operating portion;
   indication plates rotatably supported by second shafts on said casing, said second shafts being arranged substantially behind and parallel to said first shafts;
   each said indication plate including at least one indication surface and lying substantially flat on said push-plate; and
   at least one resilient member, each of which resiliently supports a plurality of said operating portions of said push-plates.

2. A study device according to claim 1, wherein:
   said first shafts are provided at a middle portion in the longitudinal direction of said push-plate.

3. A study device according to claim 1, wherein:
   said second shafts are provided at the rear end of said indication plate.

4. A study device according to claim 3, wherein:

said indication plate is provided with projections on the underside thereof forwardly of said second shafts, against which the rear end of said push-plate bears.

5. A study device according to claim 4, wherein:
the surface on said projections against which the rear end of said push-plate bears defines a cam surface.

6. A study device according to claim 1, wherein:
said indication plate is provided with an extension extending rearwardly from the rear end thereof such that, when said indication plate stands up, said extension abuts against the rear end of said push-plate.

7. A study device according to claim 6, wherein:
the free end of said extension is bent downwardly.

8. A study device according to claim 1, wherein:
said indication surface is provided on both the front and back sides of said indication plate.

9. A study device according to claim 1, wherein:
the upper surface of said push-plate is employed as an indication surface.

10. A study device according to claim 9, wherein:
the upper surface of said operating portion of said push-plate is employed as an indication surface.

11. A study device according to claim 1, wherein:
said casing is provided with a stay which supports the underside of the rear portion of said push-plate.

12. A study device according to claim 1, wherein:
said resilient member is formed of a block of urethane material.

* * * * *